United States Patent [19]
Turrell

[11] 3,780,273
[45] Dec. 18, 1973

[54] ANALOG-TO-DIGITAL WATTMETER MULTIPLIER

[75] Inventor: Douglas Walter Turrell, North Wales, Pa.

[73] Assignee: Leeds & Northrop Company, North Wales, Pa.

[22] Filed: June 12, 1972

[21] Appl. No.: 262,120

[52] U.S. Cl............ 235/150.52, 235/183, 235/194, 324/142, 328/144
[51] Int. Cl....... G06g 7/16, G06g 7/18, G01r 11/32
[58] Field of Search................ 235/194, 150.52, 235/193.5, 183, 92 EV, 92 CP; 328/158, 328/160, 142, 144; 324/142, 103, 99 D

[56] References Cited
UNITED STATES PATENTS

| | | | |
|---|---|---|---|
| 3,633,116 | 1/1972 | Richman | 328/144 |
| 3,393,308 | 7/1968 | Cope | 235/194 X |
| 3,486,014 | 12/1969 | Richman | 324/142 X |
| 3,445,768 | 5/1969 | Ferguson | 235/194 X |
| 3,517,311 | 1/1970 | Wasielewski et al. | 235/194 X |

Primary Examiner—Joseph F. Ruggiero
Attorney—Richard E. Kurtz

[57] ABSTRACT

Operational amplifier circuitry converts two analog input signals into a digital output representing the product. Two pulse forming channels generate two pulse trains, one having a frequency representing the square of the difference between the input signals and the other having a frequency representing the square of the sum of the two input signals. The difference between these frequencies is obtained in a reversible counter. The count in the counter over a given period of time represents the product of the two input signals. Where the two input signals are voltage and current, the circuit obtains a digital output representing watts in accordance with the quarter square multiplication principle.

4 Claims, 4 Drawing Figures

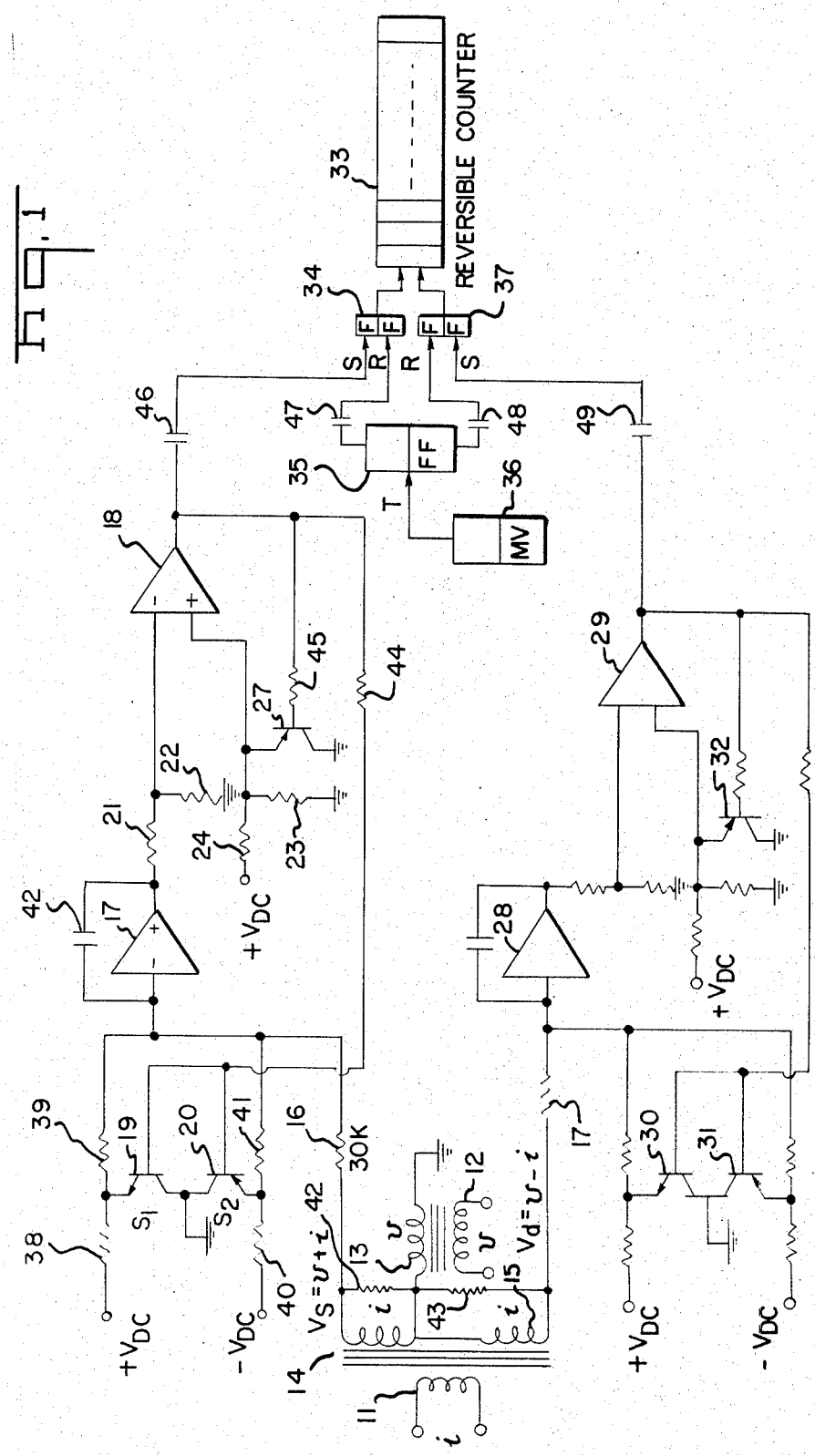

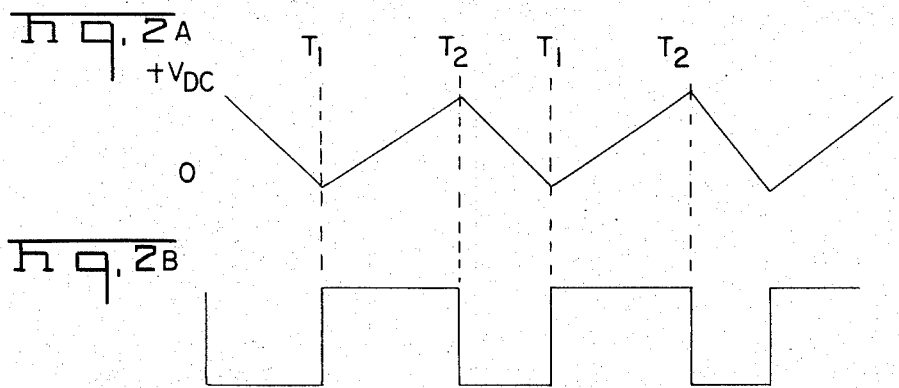
Fig. 2A
Fig. 2B
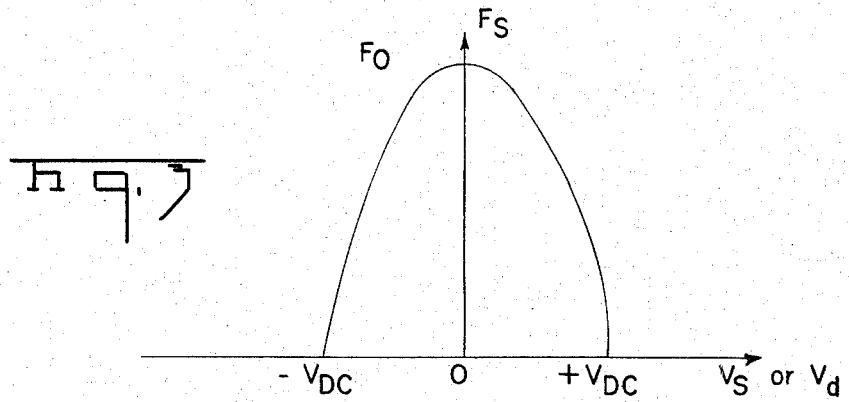
Fig. 3

ANALOG-TO-DIGITAL WATTMETER MULTIPLIER

BACKGROUND OF THE INVENTION

This invention relates to apparatus for and methods of obtaining a digital output representing the product of two analog input signals and more particularly relates to a digital wattmeter.

AC wattmeters sometimes use the quarter square principle to obtain an output representing the product between input current and input voltage. Such a wattmeter is described in "Totalizing of Electric System Loads," by P.M. Lincoln, *Transactions of the American Institute of Electrical Engineers*, July 1929, Vol. 48, No. 3. In such a wattmeter the product of voltage and current is obtained in accordance with:

$$vi = \tfrac{1}{4}[(v+i)^2 - (v-i)^2]$$

An electronic wattmeter using the quarter square principle to obtain a DC signal proportional to watt input is shown in U.S. Pat. No. 3,226,641 - Miller. In the Miller patent analog inputs representing current and voltage are multiplied by a quarter square multiplying network to obtain an analog output signal representing watts.

Recently there has been a demand for simple circuits which provide a digital output representing watts and watt-hours. Such circuits can be used, for example, in telemetering an indication of power consumed to a central location from which billing is prepared. Other examples of uses of such a circuit are in real time load frequency control and in interchange metering where it is desired to continuously monitor the power flowing through a transmission line.

U.S. Pat. No. 3,343,084 - Gambale et al. shows a system in which an output representing watts is converted into digital form. In the Gambale system analog representations of the input voltage and input current are multiplied in an analog Hall effect device. The resultant analog signal from the Hall generator is converted into digital form in a pulse counter. While such circuits may be suitable for some applications, it is desirable to have a circuit in which the conversion takes place in a digital type circuit so that the output is directly usable in digital form.

SUMMARY OF THE INVENTION

In accordance with this invention an operational amplifier connected as an integrating circuit combines signals representing the difference between two analog inputs with a reference voltage. A similar circuit combines the sum signal with the reference voltage. Each produces an alternating signal having a frequency related to the square of the sum and difference of the two analog input signals. The difference between the two frequencies represents the product of the two analog inputs.

The difference between the two frequency signals represents the product of the two analog inputs in accordance with the quarter square multiplying principle. The difference is obtained in a reversible counter which produces a digital output.

The integrating circuits integrate the combined reference signal plus input signal in one direction determined by the polarity of the reference signal until the output reaches a predetermined level. Then the integrating circuit is switched so that integration is performed with the reverse polarity of the reference signal. The time durations between switching times are inversely related to the magnitude of the sum and difference of the input and reference signals. In this way, there is obtained a series of pulses, one pulse for each cycle of up-down integration of the integrating amplifier. The frequency of one train of pulses is related to the square of the difference between the two input signals. The frequency of the other train of pulses is related to the square of the sum of the two input signals.

In particular, the sum signal is combined with a reference voltage to produce an alternating voltage signal having a frequency $$fs = F_0 \left[1 - (V_s/V_{DC})^2\right]$$

In the foregoing $v_s$ is the sum of the input signals and $V_{DC}$ is the bipolar reference signal. In a wattmeter $v_s$ is the sum of the input voltage signal and the input current signal. In the other channel, the difference between the input voltage and the input current is combined with the reference voltage to obtain an alternating signal having a frequency $$fd = F_0 \left[1 - (v_d/V_{DC})^2\right]$$

When these two frequency signals are combined in a reversible counter, the zero input operating frequency $F_0$ is cancelled. The counts remaining in the counter are proportional to $$v_s^2 - v_d^2$$

That is, the final count in the counter is proportional to $(v+i)^2 - (v-i)^2$. By the quarter square principle, this is the product of the input signals $v$ and $i$ times four. If the count in the counter is read out at short intervals, for example once each second, the count can represent watts. If the counter is read out each hour, for example, then the count will represent watt hours times 3,600. In this manner, a simple reliable circuit directly converts analog representations of voltage and current into a digital representation of the product between them.

One important advantage of this circuit is that it is capable of precision limited only by the accuracy of available state of the art components. Also, by precise adjustments of the reference voltages and the zero input operating frequencies, overall calibration is directly obtained. Another advantage is that there is an inherent digital output. There is no need to convert from an analog output into a digital output with the resulting degradation in accuracy necessary with this additional conversion.

The foregoing and other objects, features and advantages of the invention will be better understood from the following more detailed description and appended claims.

DESCRIPTION OF THE DRAWINGS

FIG. 1 shows the multiplying circuit of this invention;

FIGS. 2a and 2b are waveforms of the integrated output and one pulse train; and

FIG. 3 is a plot of output frequency as a function of the sum and difference signals $v_s$ and $v_d$.

DESCRIPTION OF A PARTICULAR EMBODIMENT OF AN AC WATTMETER

Referring to the figure, an analog input signal representing the current $i$ is applied to the primary winding 11 of an input transformer. An analog signal representing voltage is applied to the primary winding 12 of another input transformer. The secondary windings 13, 14 and 15 are connected so that a signal representing the sum of $v+i$ is applied to resistor 16 and a signal representing the difference $v-i$ is applied to resistor 17.

For the moment, consider only the channel which converts the sum signal $v+i$ into a frequency. This channel includes operational amplifier 17 and comparator amplifier 18. Transistor switches 19 and 20 alternately switch the reference voltage $+V_{DC}$ or the reference voltage $-V_{DC}$ to the input of operational amplifier 17. The input to operational amplifier 17 is the instantaneous value of the sum signal $v+i$ combined with the switched reference voltages.

The output of operational amplifier 17 is connected to the resistive divider network resistors 21, 22. Resistors 23 and 24 are connected to the source of reference voltage $+V_{DC}$. The junction of resistors 21 and 22 is connected to the inverting input of comparator amplifier 18. The junction of resistors 23 and 24 is connected to the non-inverting input of comparator amplifier 18. When the inverting input of amplifier 18 is positive with respect to the other input, the output of amplifier 18 is negative. A negative output of amplifier 18 turns on the transistor switch 17 thru current limiting resistor 45. This same negative output also turns on transistor 20 and turns off transistor 19 thru current limiting resistor 44.

Now operational amplifier 17 together with capacitor 42 integrates in the negative direction, until the inverting input to amplifier 18 goes negative and the output amplifier 18 becomes more positive. When the output of amplifier 18 becomes sufficiently positive, it turns off both transistor 20 and 27 and turns transistor 19 on. Now operational amplifier 17 and capacitor 42 integrate in the positive direction until the output of amplifier 18 is sufficiently negative to again turn off transistor switch 19 and to turn on both transistor switches 20 and 27. In this way the output of amplifier 18 produces a first series of pulses, one pulse for each complete cycle of integration of the operation amplifier channel.

Similarly, the other operational amplifier channel produces a second series of pulses. This second channel includes operational amplifier 28 and comparator amplifier 29. The signal $v-i$ is combined with the reference voltage by transistor switches 30, 31 and 32 which perform functions similar to the transistor switches 19, 20 and 27 previously described. The output of comparator amplifier 29 is a signal having a frequency related to $(v-i)^2$.

The two pulse trains, one representing $(v+i)^2$ and one representing $(v-i)^2$ are combined in the reversible counter 33. One train of pulses is applied to the counter to count in the forward direction and the other train of pulses is applied to count in the reverse direction so that the difference between them is obtained.

More specifically, the train of pulses having frequency representing $(v+i)^2$ is applied to the set input of the set-reset flip-flop 34 thru capacitor 46. The flip-flop is reset by one output of flip-flop 35. This flip-flop is triggered by the monostable multivibrator 36 which oscillates at a frequency very much greater than the expected frequencies of the pulse trains to be set into the reversible counter 33.

The other output of flip-flop 35 is applied to the reset input of flip-flop 37. The pulse train having a frequency representative of $(v-i)^2$ is applied to the set input to flip-flop 37 thru capacitor 49. The two outputs of flip-flop 35 alternately clock pulses from the two pulse trains into the reversible counter 33. That is, on one half cycle of switching of flip-flop 35 any additional pulse from the pulse train $(v+i)^2$ will be clocked into the reversible counter. On the next half cycle any additional pulse from the pulse train $(v-i)^2$ will be clocked into the reversible counter in the reverse direction, thereby effectively subtracting it from the counter standing in the counter. Other techniques known in the art of digital technology can perform this function.

The operation of the wattmeter multiplier circuit is as follows. Assume that the sum of resistance values of resistors 38 and 39 is equal to the resistance of resistor 16 and the sum of resistance values of resistors 40 and 41 is also equal to the resistance of resistor 16. Further, assume that transistor switches 27 and 20 are on and transistor switch 19 is off. When these assumptions, the current flowing into the input of operational amplifier 17 is proportional to the sum of the voltages applied to resistors 16 and 38 plus 39. The reference voltage $V_{DC}$ is shunted to ground through the emitter and collector of transistor 20. However, since transistor switch 19 is off the reference voltage $+V_{DC}$ is applied to the input to operational amplifier 17 together with the sum signal $(v+i)$. This positive input voltage causes the output of amplifier 17 to go negative toward ground potential. FIG. 2A shows the voltage at the output of operational amplifier 17. When this voltage goes through ground potential, at the time $T_1$, the inverting input of amplifier 18 becomes more negative than the non-inverting input. Note that the non-inverting input is held at ground potential by transistor 27 which is conducting. When the inverting input goes more negative than the non-inverting input, the output of amplifier 18 goes positive. The output of amplifier 18 is shown in FIG. 2B. At the time $T_1$ there is a positive-going transition.

When this positive-going transition occurs, transistors 20 and 27 are turned off and transistor 19 conducts. Now, the positive reference voltage $+V_{DC}$ is shunted to ground by transistor 19. The negative reference voltage $-V_{DC}$ is combined with the input signal $v+i$. This combined signal is applied to the input of operational amplifier 17. The result is that the output of amplifier 17 is positive-going after the time $T_1$. The voltage applied to the inverting input of amplifier 18 goes positive until the inverting input becomes more positive than the non-inverting input. Note that the non-inverting input is now held at $+V_{DC}$ reduced by the ratio of $R_{23}$ to $R_{23} + R_{24}$. The inverting input goes more positive than the non-inverting input at the time $T_2$. At this time the output of amplifier 18 is switched to a negative condition as indicated in FIG. 2B.

The input signal $v+i$ is first combined with a positive polarity reference signal so that the output of the first integrating amplifier 17 ramps in one direction until its output reaches a predetermined level. Then, the sum signal $v+i$ is combined with the reverse polarity reference signal $-V_{DC}$ and this is integrated by amplifier 17 until its output ramps in the other direction to return to the reference level. This produces a series of pulses, one pulse for each cycle of integration of the integrating amplifier 17 from the reference level to the predetermined level and returning to the reference level.

It will now be shown that the train of pulses at the output of amplifier 18 has a frequency which is related to $(v+i)^2$. The frequency of this train of pulses is:

$$f_s = 1/T_1 + T_2 \tag{1}$$

The times of switching $T_1$ and $T_2$ are determined by the time it takes to integrate between two predetermined levels. The time required for amplifier 17 to integrate between the two levels is inversely proportional to the net input current to amplifier 17. More particularly, the time required for amplifier 17 to integrate between the reference level $KV_{DC}$ and ground is given by:

$$T_1 = KV_{DC} R_{in}C/V_{DC} + v_s \tag{2}$$

where $R_{in}$ = the effective resistance of resistors 38 and 39 or resistor 16. C is the capacitance of capacitor 42. Also, the time required for amplifier 17 to integrate from ground to the reference level $KV_{DC}$ is given by:

$$T_2 = KV_{DC}R_{in}C/V_{DC} - V_s \tag{3}$$

where $R_{in}$ is the effective resistance of resistors 40 and 41 or resistor 16. Substituting Equations (2) and (3) into Equation (1) there is obtained:

$$f_s = 1/KV_{DC} R_{in} C[(1/V_{DC}v_s) + (1/V_{DC} - v_s)] \tag{4}$$

Further algebraic rearrangement gives:

$$f_s = V_{DC}/2K R_{in}C[1 - (v_s^2/V_{DC}^2)] \tag{5}$$

The nominal, or zero input operating frequency is determined by $V_{DC}/2K R_{in} C$. Therefore, Equation (5) can be rewritten in terms of the nominal operating frequency as follows:

$$f_s = F_O [1 - (v_s/V_{DC})^2] \tag{6}$$

Note that when the sum signal $v_s$ is zero, the channel will oscillate at the nominal frequency $F_O$. This is the highest frequency at which the channel oscillates. As the voltage $v_s$ increases or decreases, the output frequency $f_s$ decreases parabolically. A plot of output frequency $f_s$ as a function of the sum signal $v_s$ is shown in FIG. 3. It can be seen that the frequency $f_s$ is related to the square of the sum signal $v_s$.

It can similarly be shown that the output of the other channel, that is the output of operational amplifier 29 is given by:

$$f_d = F_O [1 - (v_d/V_{DC})^2] \tag{7}$$

It is important that the nominal or zero operating frequency $F_O$ be the same for both channels. When this is done, and when counts determined from the signals of Equation (6) and (7) are both applied differentially to the reversible counter 33, the count in the counter will be given by:

$$f_s - f_d = F_O ](v_s/V_{DC})^2 - (v_d/V_{DC})^2] \tag{8}$$

Since $v_s = v+i$ and $v_d = v-i$, the count in reversible counter 33 is given by:

$$\text{Count} = f_s - f_d = F_O/V_{DC}^2 [(v+i)^2 - (v+i)^2] \tag{9}$$

By the quarter square multiplication technique, the count in counter 33 can be shown to be equal to the product of $v$ and $i$ as follows:

Since: $(v+i)^2 + (v-i)^2 = [v^2 + 2vi + i^2 - v^2 + 2vi - i^2]$ \tag{10}

Or: $(v+i)^2 + (v-i)^2 = 4vi$ \tag{11}

Therefore:

$$\text{Count} = f_s - f_d = 4F_0/V_{DC}^2 (vi) \tag{12}$$

Assuming that the counter 33 is sampled each second, the count in it will represent the average of the instantaneous product of $v$ and $i$ for one second or watts. If the count in counter 33 is allowed to accumulate for an hour, the count at the time of sampling will be in kilowatt hours. Note also that when the net count in counter 33 is in the up direction it represents power flow in one direction. A net count in the down direction represents power flow in the opposite direction.

The following is one example of a typical circuit. The components are as follows:

resistor 37 – 20K
resistor 38 – 10K
resistor 39 – 20K
resistor 40 – 10K
resistor 16 – 30K
operational amplifier 17 – LM 308
comparator amplifier 18 – LM 311
capacitor 42 – 0.005μ
resistance 21 – 20K
resistance 22 – 10K
resistance 23 – 10K
resistance 24 – 20K
$V_{DC}$ – 10v.

The foregoing components can be adjusted to give a nominal operating frequency $F_O = 3125$ Hz. In an example of operation, the input voltage was 100 volts and the input current was 5 amps for an input of 500 watts.

The input transformer 13 had a number of turns which produced a voltage in the secondary of 2 volts. The transformer 14 had a number of turns which converted the input current into a voltage of 2 volts. Therefore, the signal $v+i = 4$ volts and the signal $v-i = 0$. The frequency of the signal at the output of amplifier 18 is given by $f_s = 3125 [1-(16/100)]$ Therefore, the frequency is $fs = 3125 (0.84) = 2625$ Hz.

The frequency at the output of operational amplifier 29 is $f_d = 3125 \times [1 - (0/100)] = 3125$ Hz.

The count in the counter 33 for each second is: $f_s - f_d = 2,625 - 3,125 = 500$ Hz. Therefore, it can be seen that the count of 500 represents the input of 500 watts.

Some important modifications of the foregoing will be mentioned. Since the component providing the digital output is the reversible counter 33, it is advantageous to share the reversible counter with a second wattmeter-multiplier connected as the second element of a 3-phase measurement scheme. This measures average 3-phase power over a sampling interval.

While two different pulse forming channels have been shown in FIG. 1, it is well within the state of the art to use one channel which is time multiplexed to perform the functions of the two channels shown in the Figure. This solves the problem that it is often difficult to obtain exactly the same nominal frequency $F_o$ for two different channels under different ambient operating conditions. Where there is only one channel, no $F_o$ balancing adjustment is necessary.

The disadvantage of the foregoing scheme is that half of the counts for the two signals are lost. A modification which solves both this problem and the problem of possible differences in nominal operating frequency between two channels is as follows. Two pulse forming channels as shown in FIG. 1 are used but the two channels are time multiplexed. That is, on one cycle the signal $v+i$ is applied to the top channel and the signal $v-i$ is applied to the bottom channel. However, on the opposite cycle the signal $v-i$ is applied to the top channel and the signal $v+i$ is applied to the lower channel. Therefore, any differences in nominal operating frequency $F_o$ will be cancelled out when the counts are applied to the counter 33.

While an A.C. wattmeter has been shown, it will be appreciated that the analog input signal may be D.C. Without the input transformers shown, the circuit substantially as shown can be used for multiplying D.C. analog signals.

It will be appreciated that the frequency of the input analog signal should be a small fraction of the zero operating frequency $F_o$. For example it should be between 1/10 and 1/100 of $F_o$.

Although the invention has been described in terms of a particular embodiment, various changes and modifications may be made without departing from the spirit of the invention or the scope of the appended claims.

What is claimed is:

1. In a quarter square multiplier for receiving two analog input signals representative of a multiplier and a multiplicand and producing a digital output product signal including:
   means for adding said two analog input signals to produce a sum signal,
   means for subtracting one of said two analog input signals from the other for producing a difference signal,
   a pair of pulse forming channels, and digital difference means for obtaining the difference between the number of pulses in said pulse forming channels in a given time interval, the improvement wherein each of pulse forming channels comprises:
      switching means for combining said sum signal or said difference signal with reference signals of opposite polarity to produce a pair of combined signals,
      an integrating amplifier having an input for receiving said pair of combined signals, said amplifier integrating one of said pair of combined signals to produce an integrated output signal which ramps in one direction toward a first predetermined level and then integrating the other of said pair of combined signals to produce an integrated output signal which ramps in the other direction toward a second predetermined level, and
      detector means responsive to said integrated output signal for actuating said switching means to produce a pulse for each cycle of integration, the frequency of the pulses being related to the square of said sum signal and the square of said difference signal.

2. The apparatus recited in claim 1 wherein said first channel comprises:
   means for combining said sum signal $V_s$ with a reference voltage $V_{DC}$ to produce a first alternating signal having a frequency $$f_s = F_O [1 - (v_s/V_{DC})^2]$$

where $F_O$ is the zero input operating frequency, and wherein said second channel comprises:
   means for combining said difference signal $V_s$ with said reference voltage to produce a second alternating signal having a frequency $$f_d = F_O [1 - (V_d/V_{DC})^2]$$

3. The apparatus recited in claim 1 wherein said digital difference means is a reversible counter, said first train of pulses being applied to said counter to count in a first direction and said second train of pulses being applied to said counter to count in the opposite direction.

4. An A.C. digital wattmeter using a quarter square multiplier for multiplying a multiplicand signal representative of an alternating voltage by a multiplier signal representative of alternating current, comprising:
   means for adding said multiplicand signal and said multiplier signal for producing a sum signal,
   means for subtracting one from the other of said multiplicand and said multiplier signals for producing a difference signal,
   means for squaring said sum signal and said difference signal, including,
   means for generating a reference signal having equal positive and negative potential,
   first switching means for combining said sum signal with said reference signal,
   a first integrating amplifier squarer for alternately integrating in one direction said sum signal and said reference signal of positive potential to a predetermined level and subsequently integrating in the opposite direction and said sum signal and said reference signal of negative potential to another predetermined level thus completing a cycle of integration, each cycle of integration producing a pulse of binary significance in a first series of pulse counts per unit of time having a frequency representative of said sum signal squared,
   first detector means responsive to the integrating output signal for actuating said first switching means,
   second switching means for combining said difference signal with said reference signal,
   a second integrating amplifier squarer for integrating in one direction said difference signal and said reference signal of positive potential to said predetermined level and integrating in the opposite direction said difference signal and said reference signal of negative potential to said another predetermined level thus completing a cycle of integration, each cycle of integration producing a pulse of binary significance in a second series of pulse counts per unit of time having a frequency representative of said difference signal squared,
   second detector means responsive to the output of said second integrating amplifier for actuating said second switching means, and
   means including a reversible counter for subtracting pulse counts in said second series of pulses from pulse counts in said first series of pulses for deriving a digital product signal per unit of time from multiplicand and multiplier signal.

* * * * *

UNITED STATES PATENT OFFICE
CERTIFICATE OF CORRECTION

Patent No. 3,780,273      Dated December 18, 1973

Inventor(s) Douglas Walter Turrell

It is certified that error appears in the above-identified patent and that said Letters Patent are hereby corrected as shown below:

Col. 1, line 18, "8" should read --[-- .

" 2, line 15, the equation should read:

$$fs = F_O \left[ 1 - \left(\frac{v_s}{V_{DC}}\right)^2 \right]$$

Col. 3, line 25, "17" should read --27-- .

. 3, line 67, "(v-i)hu 2" should read -- $(v-i)^2$ --.

Col. 4, line 9, "counter" should read -- count --.

" 4, line 18, "When" should read -- With --.

Col. 5, equation (2), after "$R_{in}$" should read a capital "C".

Col. 5, equation (3) should read:

$$T = \frac{KV_{DC} \quad R_{in}C}{V_{DC} - v_s}$$

Col. 6, equation 11, at the end of the equation "4vi" should read -- 4VL --.

Col. 6, equation 12, "Count = $f_s - f_d$" should read --Count = fs-fd --.

Col. 6, line 32, "0.005μ" should read -- 0.005μf --.

Signed and sealed this 11th day of February 1975.

(SEAL)
Attest:

RUTH C. MASON
Attesting Officer

C. MARSHALL DANN
Commissioner of Patents
and Trademarks